(12) United States Patent
Chen

(10) Patent No.: US 7,747,751 B2
(45) Date of Patent: Jun. 29, 2010

(54) IP ADDRESS ALLOCATION METHOD

(75) Inventor: Ling Chen, Beijing (CN)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 12/087,286

(22) PCT Filed: Jan. 2, 2007

(86) PCT No.: PCT/EP2007/050007

§ 371 (c)(1),
(2), (4) Date: Jun. 30, 2008

(87) PCT Pub. No.: WO2007/077234

PCT Pub. Date: Jul. 12, 2007

(65) Prior Publication Data

US 2009/0006585 A1  Jan. 1, 2009

(30) Foreign Application Priority Data

Dec. 30, 2005  (CN) .................. 2005 1 0135524

(51) Int. Cl.
*G06F 15/173* (2006.01)
*G06F 15/16* (2006.01)
(52) U.S. Cl. .................. 709/226; 709/223; 709/245
(58) Field of Classification Search ......... 709/225–226, 709/236, 245
See application file for complete search history.

(56) References Cited

U.S. PATENT DOCUMENTS 6,614,788 B1 * 9/2003 Martin et al. ............... 370/392
6,862,286 B1 * 3/2005 Tams et al. ................. 370/401
7,027,432 B2 * 4/2006 Carolan et al. ............. 370/352
7,058,022 B1 * 6/2006 Carolan et al. ............. 370/254
7,430,614 B2 * 9/2008 Shen et al. .................. 709/245
7,464,165 B2 * 12/2008 Vo et al. ..................... 709/226
7,502,866 B2 * 3/2009 Tarvainen et al. .......... 709/245
7,529,815 B2 * 5/2009 Droms ....................... 709/220
7,533,407 B2 * 5/2009 Lewis et al. ................... 726/6
7,539,770 B2 * 5/2009 Meier ......................... 709/236

OTHER PUBLICATIONS

S. Park et al.; "Rapid Commit Option for the Dynamic Host Configuration Protocol Version 4 (DHCPv4)"; Request for Comments: 4039; Network Working Group; Mar. 2005; pp. 1-10.
A. Dutta et al.; "MPA Assisted Optimized Proactive Handoff Scheme"; 2nd Annual Int'l Conference on Mobile and Ubiquitous Systems: Networking and Services; Jul. 2005; pp. 155-165.
International Search Report for Application No. PCT/EP2007/050007; mailed Mar. 13, 2007.

* cited by examiner

*Primary Examiner*—Hussein A Elchanti
(74) *Attorney, Agent, or Firm*—Staas & Halsey, LLP

(57) ABSTRACT

A DHCP server allocates IP addresses to DHCP clients and the IP address validation process is moved from the client to the DHCP server. The DHCP server is required to periodically select a predefined number of validated IP addresses from its unused IP addresses. When a client applies for an IP address, the DHCP server allocates an IP address from its selected validated IP addresses to the client, and the client then directly uses the IP address allocated by the DHCP server. This method may be used for providing VoIP in mobile phones, wherein the voice session interruption is shortened sufficiently before the mobile terminal acquires a new IP address through the fast IP address re-allocation to a mobile terminal, thereby ensuring mobile VoIP communication quality.

10 Claims, 3 Drawing Sheets

IP ADDRESS ALLOCATION METHOD

CROSS REFERENCE TO RELATED APPLICATIONS

This application is based on and hereby claims priority to Chinese Application No. 200510135524.2 filed on Dec. 30, 2005, the contents of which are hereby incorporated by reference.

BACKGROUND

Described below is a method that relates to Internet communications technology, in particular, an IP address allocation method and its usage.

As well as providing traditional data communications, broadband Internet is also ideal for VoIP (voice telephony). VoIP can provide clients with many practical and effective functionalities, including lower business costs, unifying voice and data communications, and consolidating Internet management platforms, etc. VoIP is a telephony application which operates through TCP/IP (Transfer Control Protocol/Internet Protocol) protocols over the IP net. VoIP technology is currently not only hugely successful on the fixed Internet, but is making steady progress on the mobile Internet, especially in emerging 3G services, and it is forecast that VoIP will become the main technology for telephony. VoIP mobile terminals can access the Internet via WLAN (Wireless Local Area Network). WLAN uses wireless communications technology to establish an Internet connection within a specified area, and is a product of the combination of computer network and wireless communications technology. It can transfer media over multiple wireless communications channels and provide traditional fixed-line area network capabilities, providing users with effective broadband Internet access anytime, anywhere. Within a WLAN network, wireless terminals fitted with wireless connection cards use wireless access points (AP) as hubs to connect the wireless local area network to the fixed-line network via wireless bridges, wireless access gateways, wireless access controllers, wireless access servers, etc., which can create a variety of sophisticated wireless local area network access routes, and provide wireless mobile office access.

When a VoIP mobile terminal (MT) hands over among different IPv4 subnets, the MT must apply for a new IP address (IP address re-allocation) to effect handover from one IPv4 subnet access point to another. Before the MT receives this new IP address, any conversation over the MT must be interrupted. This requires the IP address re-allocation process to be fast enough (less than 20 ms) to prevent extended interruption to voice conversations, and reduce call quantities.

Current technology normally uses DHCP (Dynamic Host Configuration Protocol) to implement high-efficiency dynamic IP address allocation. DHCP is based upon the typical client/server model, where the client initiates requests, and the server replies with the appropriate reply. In this case the client is a normal computer, and the server is a DHCP server—when the computer instructing or requesting an address from a DHCP server by issuing an address request, the DHCP server automatically provides the client with an IP address and other Internet parameters, and dispatches a reply. As can be seen from FIG. 1, the DHCP service procedure is as follows:

1. The identification phase, where the DHCP client is seeking a DHCP server. The DHCP client in broadcast mode (because the DHCP server's IP address is unknown to the client) emits "DHCP discover" signals, seeking a DHCP server by sending specific broadcast information to 255.255.255.255. All Internet hosts on which the TCP/IP protocol is installed will receive this broadcast signal, but only DHCP servers will be able to reply.

2. The allocation phase, where the DHCP server allocates the IP addresses. Any DHCP server in the Internet will reply to a "DHCP discover" signal, allocate one of its unallocated IP addresses to the DHCP client, and send an allocation signal including the allocated IP address and other "DHCP offer" data.

3. The selection phase, where the DHCP client selects the IP address provided by a DHCP server. If several DHCP servers dispatch "DHCP offer" signals to the DHCP client, the DHCP client will only accept the first "DHCP offer" signal that it receives, and then replies in broadcast mode with "DHCP request" signal, which contains the IP address which it requested from the DHCP server that it selected. This reply in broadcast mode then notifies all DHCP servers that it has selected the IP address provided by that specific DHCP server.

4. The confirmation phase, where the DHCP server confirms the IP address that it provided. When the DHCP server receives the "DHCP request" signal reply from the DHCP client, it sends a "DHCP ack" acknowledgement which contains the IP address that it allocated and other defined to the DHCP client, to confirm to the DHCP client that it may use the IP address that it provided. After that, the DHCP client then binds its TCP/IP protocol to the network card, and all other DHCP servers except for the server which the DHCP client selected then retrieve the IP address which they allocated.

5. Re-registration. Whenever the DHCP client subsequently re-registers on the network, it no longer needs to transmit a "DHCP discover" signal, but can directly transmit a "DHCP request" signal containing its previously allocated IP address. When the DHCP server receives this signal, it will attempt to allow the DHCP client to continue to use the original IP address, and reply with a "DHCP ack" acknowledgment signal. If this IP address cannot be re-allocated for use by the original DHCP client (for example where the IP address has already been allocated to another DHCP client), the DHCP server replies to the DHCP client with a "DHCP nack" denial signal. Upon receiving this "DHCP nack" signal, the DHCP client must then re-transmit a "DHCP discover" signal to request a new IP address.

However, using the DHCP protocol for dynamic address allocation has one drawback: DHCP cannot identify the IP addresses in use by non-DHCP clients on the network, and when there is more than one DHCP server operating on one network, a DHCP server cannot verify the IP addresses already allocated by other servers. For these reasons, the DHCP protocol requests the client to use ARP (Address Resolution Protocol) to validate the allocated IP addresses. ARP uses transmitted signals to receive the MAC addresses for IP addresses on the network. The client transmits broadcast packages to all hosts on the same section of the network, so that when any host using the same IP address receives this package, it will send a reply signal to the client. In multiple applications, the ARP response time definition exceeds 1 second, while DHCP requests the client to wait at least 10 seconds before initiating another application. During this time, the MT thus has no allocated IP address, and any conversation on the MT will be interrupted, which will affect communication quality.

SUMMARY

Described below is a method of allocating IP addresses, to resolve the defects of excessive IP re-allocation procedure time and insufficient connection time in current technology, which brings allocated IP address into effect by ARP when using DHCP to allocate IP addresses, and to improve IP address allocation speed and satisfy the requirements for real-time applications.

Also described is a practical mobile VoIP method, to improve issues with interruptions in communication in current technology caused by extended IP address re-allocation when mobile users hand over from one access point to another, to reduce the time taken by mobile terminals to re-allocate IP addresses in inter-subnet handovers, and improve mobile VoIP communication quality.

In order to achieve this, the following technical aspects are addressed:

An IP address allocation method, including:
A. A DHCP server periodically selects a predefined number of validated IP addresses from its unused IP addresses;
B. The DHCP server allocates an IP address from its selected validated IP addresses when a client applies for an IP address;
C. The client directly uses the IP address allocated by the DHCP server.

Step A includes:
A1. The DHCP server establishes an unused IP address pool and a usable IP address pool;
A2. Based on IP addresses in the unused IP address pool, a predefined number of validated IP addresses are periodically retained in the usable IP address pool;

Step A2 includes:
A21. The DHCP server periodically checks the number of IP addresses in the usable IP address pool;
A22. When the number of IP addresses in the usable IP address pool does not reach the predefined number, an IP address is selected from the unused IP address pool and validated;
A23. The validated IP address is then moved from the unused IP address pool to the usable IP address pool.

Optionally the validity of the IP addresses in the usable IP address pool can be checked before checking the number of IP addresses in the usable IP address pool;

Where an IP address in the usable IP address pool has expired, the expired IP address is deleted.

The steps for selecting an IP address from the unused IP address pool and validating it include:
An IP address is selected from the unused IP address pool;
The selected IP address is then checked for existing use in a subnet via ARP;
Based on the ARP check result, if the selected IP address is not in use in a subnet, it is then validated.

The step for selecting an IP address from the unused IP address pool is: Select an IP address from the unused IP address pool randomly or according to a specific order.

The steps for checking whether the selected IP address is in use in a subnet via ARP include:
The DHCP server broadcasts the selected IP address to all hosts in subnets;
A reply received from any host within a predefined time indicates that the selected IP address is already in use on a subnet;

Otherwise, this indicates that the selected IP address is not in use on a subnet.

When an IP address is released, the DHCP server puts the released IP address back in the unused IP address pool.

A method for providing VoIP in mobile phones, includes:
a. A DHCP server periodically selects a predefined number of validated IP addresses from its unused IP addresses;
b. When a mobile user detects an inter-subnet handover, it instructs the DHCP client terminal to request a new IP address from a DHCP server on the target subnet;
c. The DHCP server allocates an IP address to the mobile user from its selected validated IP addresses;
d. Once the mobile user receives the DHCP confirmation message from the DHCP server, it uses the IP address allocated by the DHCP server to establish a connection to the target subnet.

Step a includes:
a1. The DHCP server establishes an unused IP address pool and a usable IP address pool;
a2. The DHCP server periodically detects the number of IP addresses in the usable IP address pool;
a3. When the number of IP addresses in the usable IP address pool do not reach a predefined number, an IP address is selected from the unused IP address pool and validated;
a4. After validation, the IP address is moved from the unused IP address pool to the usable IP address pool.

Optionally the validity of the IP addresses in the usable IP address pool can be checked before checking the number of IP addresses in the usable IP address pool;

Where an IP address in the usable IP address pool has expired, the expired IP address is deleted.

The steps for selecting an IP address from the unused IP address pool and validating it include:
An IP address is selected from the unused IP address pool;
The selected IP address is then checked for existing use in a subnet via ARP;
Based on the ARP check result, if the selected IP address is not in use in a subnet, it is then validated.

When an IP address is released, the DHCP server puts the released IP address back in the unused IP address pool.

It can be seen from the technical aspects given above that the IP address validation process is moved from the client to the DHCP server during the dynamic IP address re-allocation process, in such a way that the DHCP server not only maintains an unused IP address pool, but also simultaneously maintains a usable IP address pool, and maintains the validity of the IP addresses in its usable IP address pool by periodic checks. When an MT (Mobile Terminals) requests an IP address to be allocated, a validated IP address can be selected from the usable IP address pool, allowing the MT to implement the allocated IP address without verification by ARP, thus leading to great savings in the time required for IP re-allocation and ensuring the continuity of MT communications. This is simple to implement, and is highly reliable.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Figure 1:
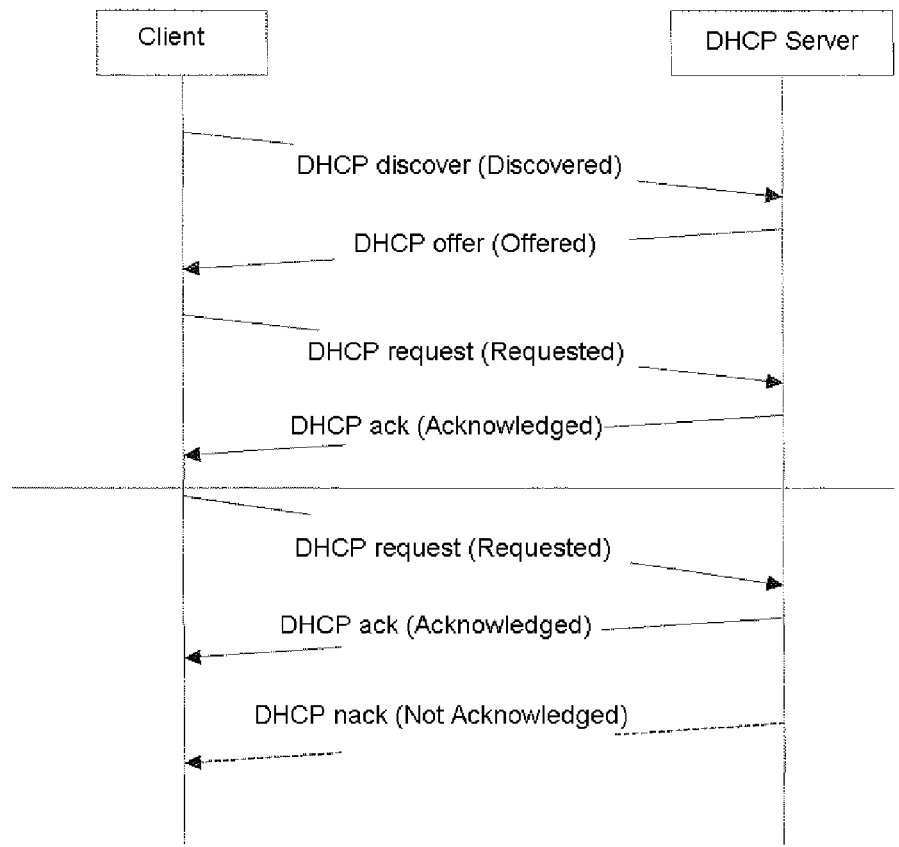
FIG. 1 shows the DHCP server workflow.

Reference will now be made in detail to the preferred embodiments, examples of which are illustrated in the accompanying drawings, wherein like reference numerals refer to like elements throughout.

This method moves the IP address validation process from the client to the DHCP server when a DHCP server allocates an IP address to a DHCP client. In order to do this, the DHCP server must periodically select a predefined number of validated IP addresses from its unused IP addresses; when a client requests an IP address, the DHCP server allocates an IP address from its selected validated IP addresses; in this way, the client can directly use the IP address allocated by the DHCP server, and obviates the need to run through the IP address validation process. When this method is applied to mobile VoIP, such that mobile terminals run through the IP address re-allocation procedure using this method, when the mobile terminal is handed over among access points of different IP subnets and the mobile terminal requests a new IP address from the target subnet's DHCP server, any conversation interruption is thus minimized before the mobile terminal receives its new IP address and mobile VoIP communication quality is ensured.

To provide a better understanding of the technical aspects to personnel in this field, below are figures and approaches of execution.

Figure 2:
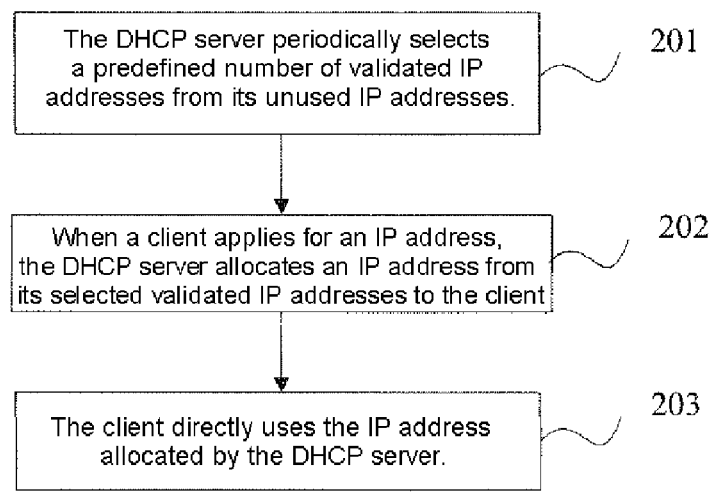
FIG. 2 shows the actual workflow of the IP address allocation method.

Refer to FIG. 2, which shows the actual workflow of the IP address allocation method including: Step 201: The DHCP server periodically selects a predefined number of validated IP addresses from its unused IP addresses. When implementing this in practice, many methods may be used, which will be described in detail later.

Step 202: When a client applies for an IP address, the DHCP server allocates an IP address from its selected IP addresses to the client. The IP address allocated to the client can be either chosen from the validated IP addresses or selected in order according to its size. When multiple clients simultaneously request IP addresses from the DHCP server, different IP addresses are allocated from these validated IP addresses in order to the clients.

For example, a DHCP server maintains four validated IP addresses, as follows: 192.168.1.2, 192.168.10.3, 192.168.0.1, and 192.168.0.3. When three clients simultaneously request IP addresses from the DHCP server, it will allocate 192.168.0.1, 192.168.0.3 and 192.168.1.2 by numerical order to these three clients. In this way, the next time that the DHCP needs to select new validated IP addresses from the unused IP addresses, it can then only select one, so as to maintain a set number of validated IP addresses (four).

If five clients simultaneously request IP addresses from the DHCP server, it will only have four validated IP addresses to allocate, which means that its validated IP addresses will be used up. In this situation, the DHCP server must wait till the next period before it can once again select the predefined number of validated IP addresses from the unused IP addresses and allocate an IP address to the client. Thus, the IP address allocation speed is reduced to the same as that of a standard DHCP allocation. For this reason, in situations where the network is heavily used (rapid IP allocation), it is appropriate to select a higher number of validated IP addresses, to ensure that any user on the subnet can be allocated a validated IP address in a timely manner.

The number of validated IP addresses maintained by the DHCP server can also be altered dynamically, such as by setting the number of validated IP addresses to be maintained within a certain time, or certain check period.

In rapid IP address allocation, the DHCP server must handle IP address validation. When the DHCP server maintains an excessively high number of validated IP addresses, however, the validation checks which the DHCP server periodically carries out on its unused IP addresses will use more resources than normal DHCP, because in normal DHCP, IP address validation only occurs in the IP allocation phase.

Therefore, the number of validated IP addresses can be set according to network load and environment in practical applications.

Step 203: The client uses the IP address directly which is allocated by the DHCP server.

Personnel in this technology field are aware that DHCP service provides many benefits, such as, it will not allocate the same IP address to two different hosts; DHCP managers can also restrict a specific host to a specific IP address, etc.

However a DHCP server also has several flaws: it cannot identify the IP addresses in use by non-DHCP clients on the network; and when there is more than one DHCP server operating on one network, a DHCP server cannot verify the IP addresses already allocated by other servers, etc. Hence, in normal DHCP, when a DHCP client receives the IP address allocated by a DHCP server, it cannot ensure that the address is validated. At this point, it must verify its validity, and check whether that IP address will conflict with IP addresses from other hosts on that network.

DHCP clients normally use ARP (Address Resolution Protocol) to detect IP address conflicts. The ARP protocol works by converting a computer's network address (its IP address) to a physical address (its MAC address). The ARP protocol is a link layer protocol, which ensures the connection from one host to another host on a network using a 48-bit Ethernet address (hardware address) instead of a 32-bit IP address in an Ethernet data frame. When a host with an identical IP address exists on the network, it issues an IP address conflict warning. For example, if host B establishes IP address 192.168.0.1 and is in active condition, and another server, A, alters its IP address to 192.168.0.1, then an IP address conflict will be created. The reason is as follows: when host A connects to the network (or alters its IP address), it will send an ARP package to the network broadcasting its own IP address, which is also a free ARP. If host B with an identical IP address remains on the same network, B will reply via ARP to that address, and once A receives this reply, A will issue an IP address conflict warning, and of course B will also issue a warning.

By using this method, the client need not run any further conflict check for any IP address and can use it directly, because the IP address allocated by the DHCP server is selected after a DHCP check that guarantees that no address conflicts occur with other clients on the subnet.

The actual procedure in Step 201 above whereby a DHCP server periodically selects a predefined number of validated IP addresses has many variations, which are explained in detail below.

Figure 3:
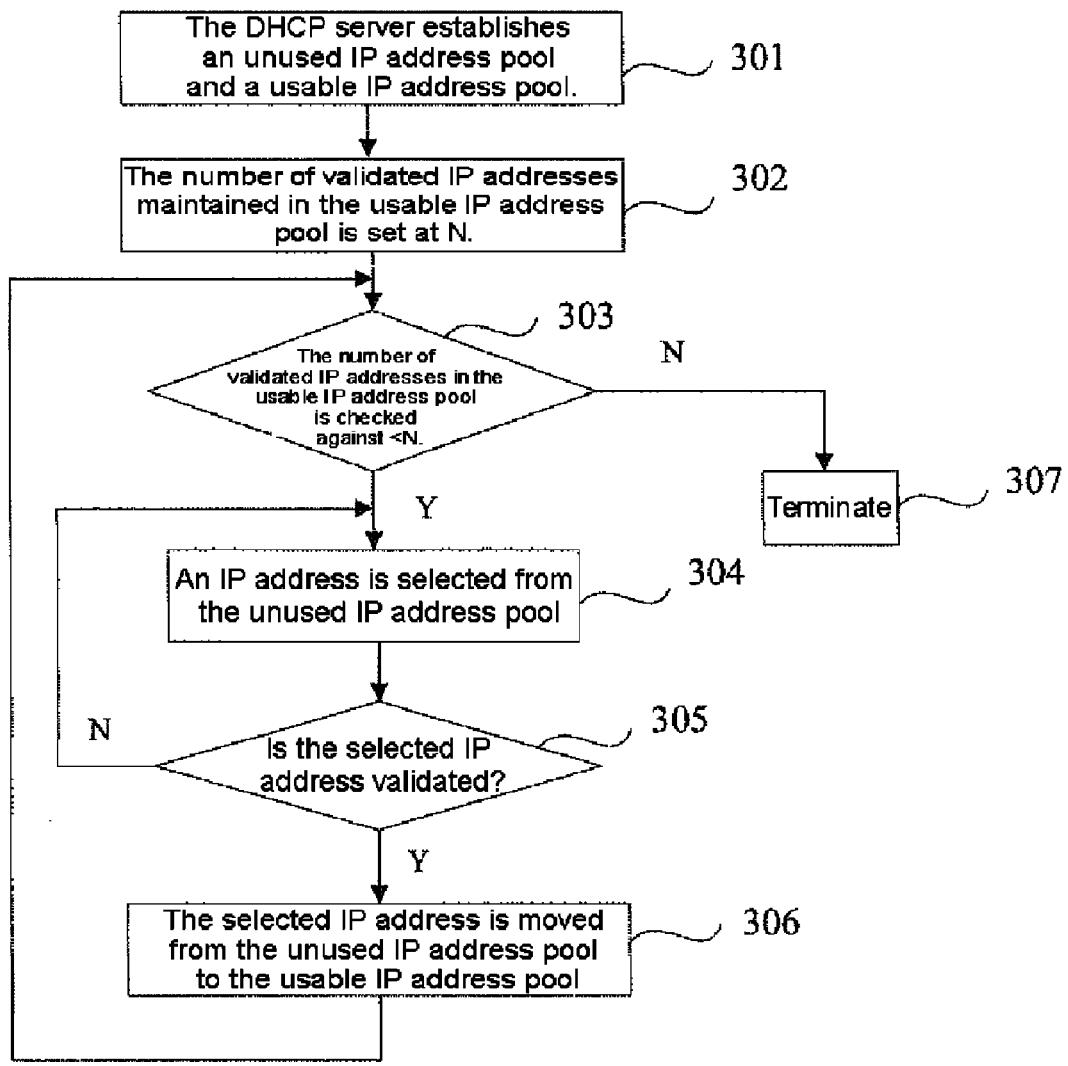
FIG. 3 shows the actual workflow whereby the DHCP server periodically selects a predefined number of validated IP addresses.

Refer to the workflow shown in FIG. 3: In this implementation, when the DHCP server establishes an unused IP address pool and a usable IP address pool, the DHCP server periodically maintains the predefined number of validated IP addresses in the usable IP address pool according to the IP addresses in the unused IP address pool. This includes:

Step 301: The DHCP server establishes an unused IP address pool and a usable IP address pool. In normal DHCP, the DHCP server maintains an IP address pool (the unused IP address pool), which contains all unused IP addresses. It must also establish another IP address pool (the usable IP address pool). All IP addresses in the usable IP address pool originate from the unused IP address pool.

Step 302: The number of validated IP addresses maintained in the usable IP address pool is set at N.

Step 303: The number of IP addresses in the usable IP address pool is checked against N. If the number is equal, go to Step 307.

Step 307: The checking procedure is terminated. If the number is not equal, go to Step 304.

Step 304: An IP address is selected from the unused IP address pool. The IP address can be either chosen at random from the unused IP address pool or selected in order according to its size.

Step 305: Check whether the selected IP address is validated, i.e. whether there is any conflict with any IP address from another host on the subnet.

A detailed description is given above of the current technical process whereby the client validates the IP address that is allocated by the DHCP server. However a similar method can be used on the DHCP server, using ARP to check whether the selected IP address is already in use on the subnet.

The DHCP server broadcasts the selected IP address to all of the hosts on the subnet; a reply message from any host received within a predefined time indicates that the selected IP address is already in use on the subnet. Otherwise this indicates that the selected IP address is not in use. Depending on the ARP check result, if it is not in use on the subnet, the selected IP address is then validated. If it is validated, go to Step 306.

Step 306: The selected IP address is moved from the unused IP address pool to the usable IP address pool, and Step 303 is then repeated. If it is invalid, Step 304 is repeated to select the next IP address from the unused IP address pool.

When an IP address is released (via DHCP time control system or the "DHCP release" message), the DHCP server must replace the released IP address back in the unused IP address pool, in order to make it available to subsequent clients.

In the above implementation procedure, when the IP addresses in the usable IP address pool are checked, only the number of IP addresses is checked to verify whether these reach predefined figure N. It has already been mentioned that in a network with multiple DHCP servers, one DHCP server is unable to verify the IP addresses allocated by another server. In this way, the IP addresses in the usable IP address pool may still possibly be expired. If no check is made of their validity, IP addresses allocated to users may be invalid. In this case, the client may be used to complete the validation check, i.e., when the user directly uses the IP address, an IP address conflict will occur, at which time the client will need to request an IP address from the DHCP server again.

Clearly, in order to completely guarantee that IP addresses allocated to users do not cause a conflict with other users' IP addresses on the subnet, the validity of the unallocated IP addresses in the usable IP address pool should be checked before checking the number of IP addresses in the usable IP address pool in Step 303 above; if the IP address is invalid, the expired IP address should be deleted; otherwise the IP address should be retained. The method for detecting whether the IP addresses in the usable IP address pool are validated is the same as that for detecting whether the selected IP addresses in the unused IP address pool are validated, and can both be checked via ARP. FIG. 3 illustrates the practical procedure for establishing a usable IP address pool and making the DHCP server periodically maintain the predefined number of validated IP addresses.

Practical applications are not limited to using this implementation method. For example, one can also establish an IP address table containing all unallocated IP addresses and their validation symbol.

The DHCP server periodically performs a check of the IP addresses in the table and their validation symbols. If an IP address is validated, its validation symbol is "1", and if not, its validation symbol is "0". Each time that the detected number of validated IP addresses reached a predefined value, the checking process is terminated.

When a client requests an IP address, this is allocated in numerical order from the IP addresses whose symbol reads "1". Once the allocation process is completed, its symbol is changed to "0".

When an IP address is released (via DHCP time control system or the "DHCP release" message), the DHCP server must replace the released IP address back in the IP address table, and reset its symbol to "0" in order to make it available to subsequent clients.

Personnel in this technology field are aware that as network technology and mobile services develop, network applications are increasingly varied, an increasing number of mobile terminals have the ability to query IP networks, and users want to be able to query an IP network any time, anywhere. In VoIP, the conversation signal is converted into a coded, digital, compressed compression frame, and is then converted into IP data packages and transferred over the IP network, thus fulfilling the aim of providing voice communication over the IP network. IP telephony has greatly improved the network bandwidth usage ratio, greatly reduced the costs of communication, and its widespread application has also provided impetus to the development of broadband multimedia applications. The greatest benefit of VoIP is that it has broadened the use of the Internet and the globally interconnected IP environment, providing more and better services than traditional services. VoIP can easily transmit voice, fax, video, and data services over the IP network. Furthermore, mobile VoIP is the ideal integration of mobile communications and Internet communications.

Mobile terminals access the IP network through an AP (access point), but the mobile nature of these terminals requires them to handover among different IP subnets. When handing over among IP subnets, the mobile terminals must request a new IP address, for the following two reasons:

1. The IP subnet uses global IP addresses. In this situation, each IP subnet must use a different IP address range (network section) due to the limitations of the IP route. In order to re-establish the IP connection on the new subnet, the terminal must use the IP address from the new subnet network section. At this point the terminal's IP address must necessarily change.

2. An IP subnet uses permanent addresses. At this time, neighboring subnets can use the same network section, or use different network sections. Because of this, the terminal's IP address may not be changeable. However, it should be considered that, as there may be other terminals on the new subnet which occupy the same address, the terminal may be unable to learn whether the same original IP address can be used continuously.

Under these two circumstances, the identical IP address re-allocation procedure may be used.

Before the mobile terminal is allocated a new IP address, any conversation must be interrupted. Accordingly, the IP address allocation speed will affect mobile VoIP communication quality—an important consideration.

By using the high-speed IP address allocation method described herein, it is possible to effectively avoid lengthy interruptions to conversations, and under normal circumstances, this can be kept to below 20 ms.

Figure 4:
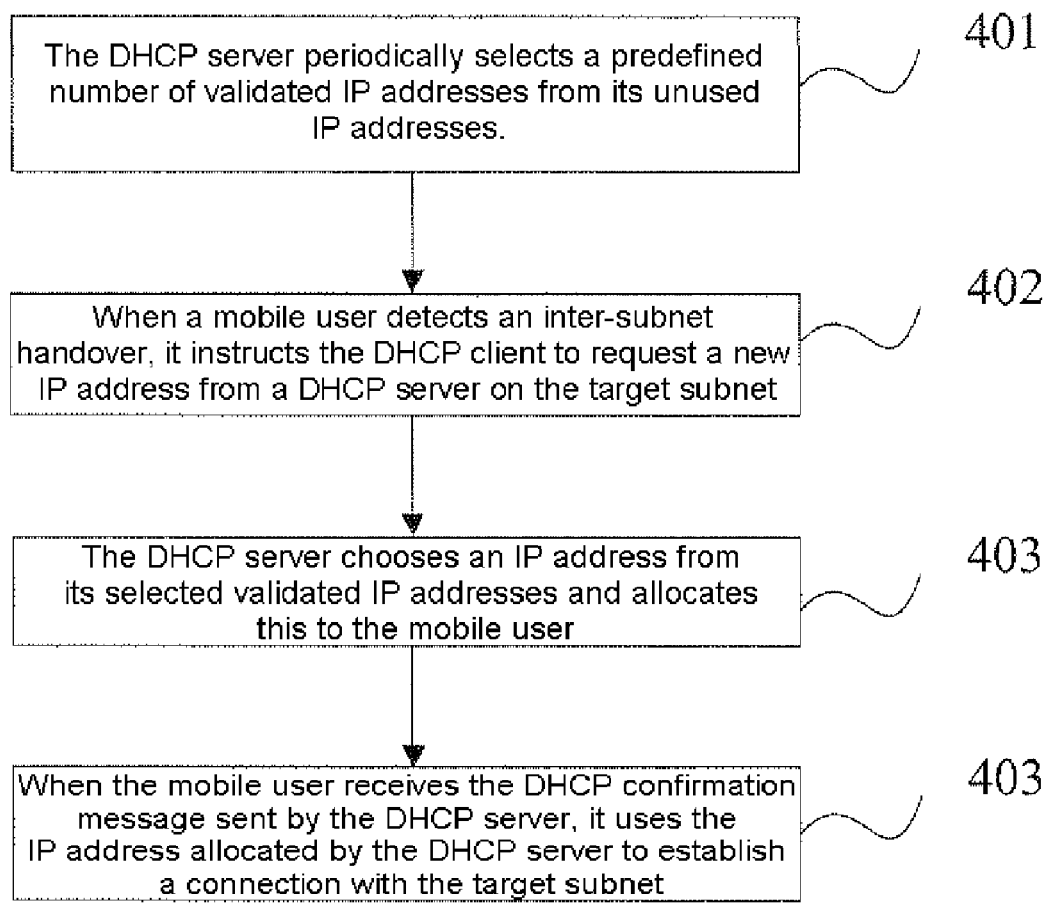
FIG. 4 shows the actual workflow of the method whereby mobile VoIP is provided.

See FIG. 4 which illustrates the practical VoIP method workflow, which includes:

Step 401: The DHCP server periodically selects a predefined number of validated IP addresses from its unused IP addresses. The practical procedure by which the DHCP server maintains the predefined number of validated IP addresses has already been described in detail, and is therefore not repeated herein.

Step 402: When a mobile user detects an inter-subnet handover, it instructs the DHCP client to request a new IP address from a DHCP server on the target subnet.

Step 403: The DHCP server chooses an IP address from its selected validated IP addresses and allocates this to the mobile user.

Step 404: When the mobile user receives the DHCP confirmation message sent by the DHCP server, it uses the IP address allocated by the DHCP server to establish a connection with the target subnet.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

The above practical examples describe the IP address allocation method in mobile VoIP applications, although it should be noted that as circumstances change, this method may in the future be used in other real-time services which require IP address allocation, to enable improved real-time service system load capabilities and service quality.

Although practical examples have been used to describe this method, general personnel in this technology field will be aware that this method is open to many variations and adaptations which do not abandon the basic principles, and it is hoped that these claims will include the many variations and adaptations which do not abandon this basic principle.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for IP address allocation, comprising:
   periodically selecting, by a dynamic host configuration protocol server, a predefined number of validated IP addresses from unused IP addresses of the dynamic host configuration protocol server, said validated IP addresses being checked including via an address resolution protocol for existing use in a subnet; and
   allocating, by the dynamic host configuration protocol server, an IP address from selected validated IP addresses of the dynamic host configuration protocol server, when a client applies for an IP address, the client directly using the IP address allocated by the dynamic host configuration protocol server;
   establishing, by the dynamic host configuration protocol server, an unused IP address pool and a usable IP address pool;
   periodically retaining, based on IP addresses in the unused IP address pool, a predefined number of validated IP addresses in the usable IP address pool;
   periodically checking, by the dynamic host configuration protocol server, a number of IP addresses in the usable IP address pool;
   selecting and validating an unused IP address from the unused IP address pool, when the number of IP addresses in the usable IP address pool is smaller than the predefined number; and
   moving the unused IP address, after said selecting and validating, from the unused IP address pool to the usable IP address pool.

2. The method according to claim 1, wherein said retaining further comprises:
   checking validity of the IP addresses in the usable IP address pool before said checking of the number of IP addresses in the usable IP address pool; and
   deleting one of the IP addresses in the usable IP address pool, if said checking determines the one of the IP addresses is invalid.

3. The method according to claim 2, wherein said selecting and validating comprises:
   selecting the unused IP address from the unused IP address pool;
   checking the unused IP address that was selected for existing use in a subnet via an address resolution protocol to obtain a check result;
   validating the unused IP address that was selected, if the check result indicates the unused IP address is not in use in a subnet.

4. The method according to claim 3, wherein said selecting the unused IP address from the unused IP address pool is performed randomly or according to a specific order.

5. The method according to claim 3, wherein said checking the unused IP address that was selected for existing use comprises:
   broadcasting, by the dynamic host configuration protocol server to all hosts in subnets, the unused IP address that was selected; and
   receiving a reply from any host within a predefined time to indicate that the selected IP address is already in use on the subnet associated therewith and otherwise determining that the unused IP address that was selected is not in use on any subnet.

6. The method according to claim 1, wherein further comprising putting a released IP address back in the unused IP address pool, by the dynamic host configuration protocol server, when an IP address is released.

7. A method for providing VoIP in mobile phones, comprising:
   periodically selecting, by a dynamic host configuration protocol server, a predefined number of validated IP addresses from unused IP addresses of the dynamic host configuration protocol server, said validated IP addresses being checked including via an address resolution protocol for existing use in a subnet;
   upon detection of an inter-subnet handover by a dynamic host configuration protocol client terminal, sending a request for a new IP address from the dynamic host configuration protocol client terminal to the dynamic host configuration protocol server on a target subnet;
   allocating, by the dynamic host configuration protocol server, an IP address from selected validated IP addresses of the dynamic host configuration protocol server, in response to the request;

sending a dynamic host configuration protocol confirmation message from the dynamic host configuration protocol server to the dynamic host configuration protocol client terminal, based on said allocating; and using the IP address allocated by the dynamic host configuration protocol server to establish connection to the target subnet upon receipt of the dynamic host configuration protocol confirmation message from the dynamic host configuration protocol server;

establishing by the dynamic host configuration protocol server, an unused IP address pool and a usable IP address pool;

periodically detecting, by the dynamic host configuration protocol server, a number of IP addresses in the usable IP address pool;

selecting and validating an unused IP address from the unused IP address pool, when the number of IP addresses in the usable IP address pool is smaller than a predefined number; and moving the unused IP address, after said selecting and validating, from the unused IP address pool to the usable IP address pool.

8. The method according to claim 7, wherein said selecting further comprises:

checking validity of the IP addresses in the usable IP address pool before said checking of the number of IP addresses in the usable IP address pool; and deleting one of the IP addresses in the usable IP address pool, if the one of the IP addresses has expired.

9. The method according to claim 8, wherein said selecting and validating comprises:

selecting the unused IP address from the unused IP address pool;

checking the unused IP address that was selected for existing use in a subnet via an address resolution protocol to obtain a check result;

validating the unused IP address that was selected, if the check result indicates the unused IP address is not in use in a subnet.

10. The method according to claim 8, further comprising putting a released IP address back in the unused IP address pool, by the dynamic host configuration protocol server, when an IP address is released.

* * * * *